April 9, 1929.   C. STENBOL   1,708,036
WIND GAUGE OR ANEMOMETER
Filed July 17, 1925   4 Sheets-Sheet 1
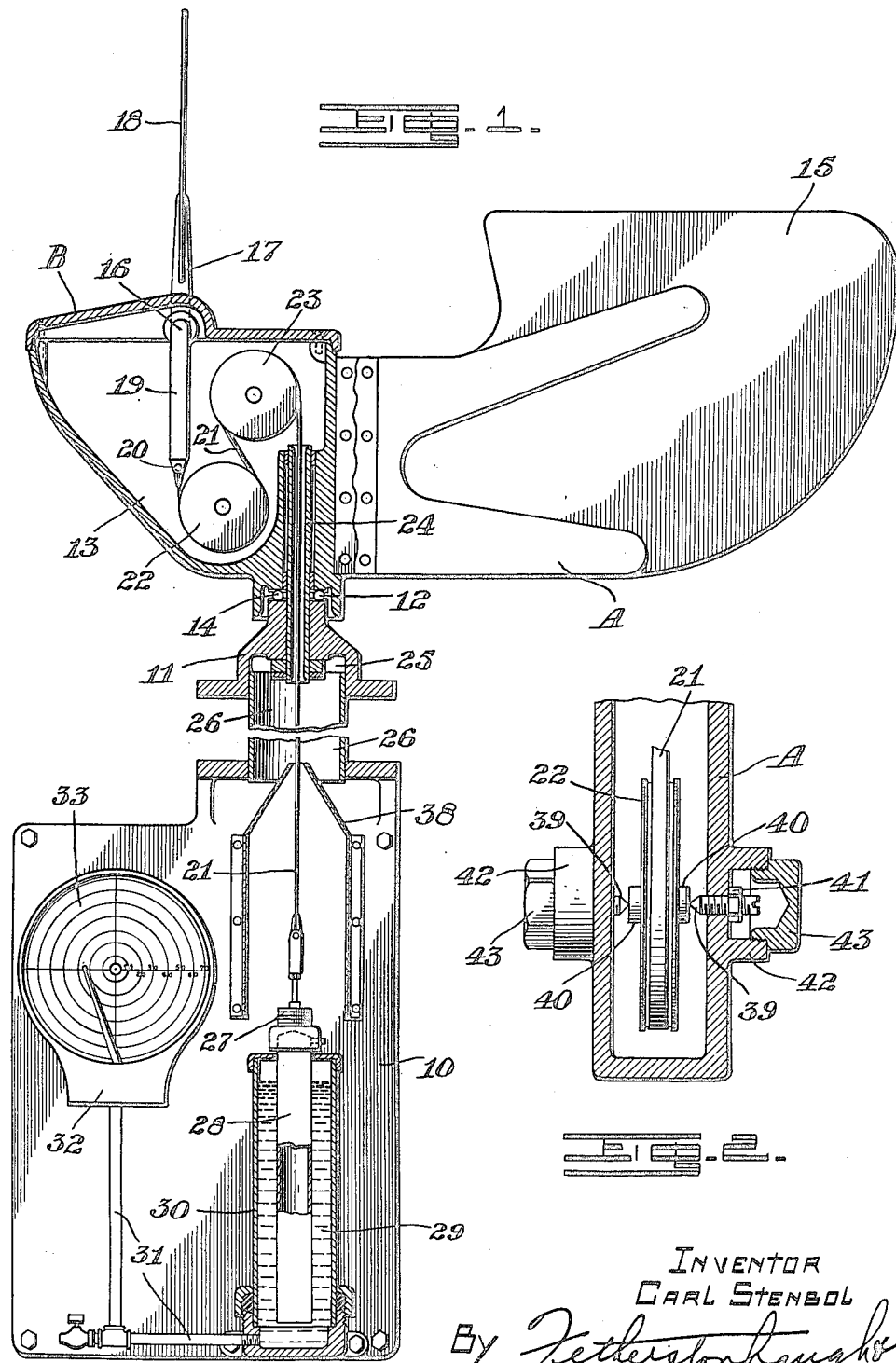
INVENTOR
CARL STENBOL
By Featherstonhaugh & Co
Att'ys

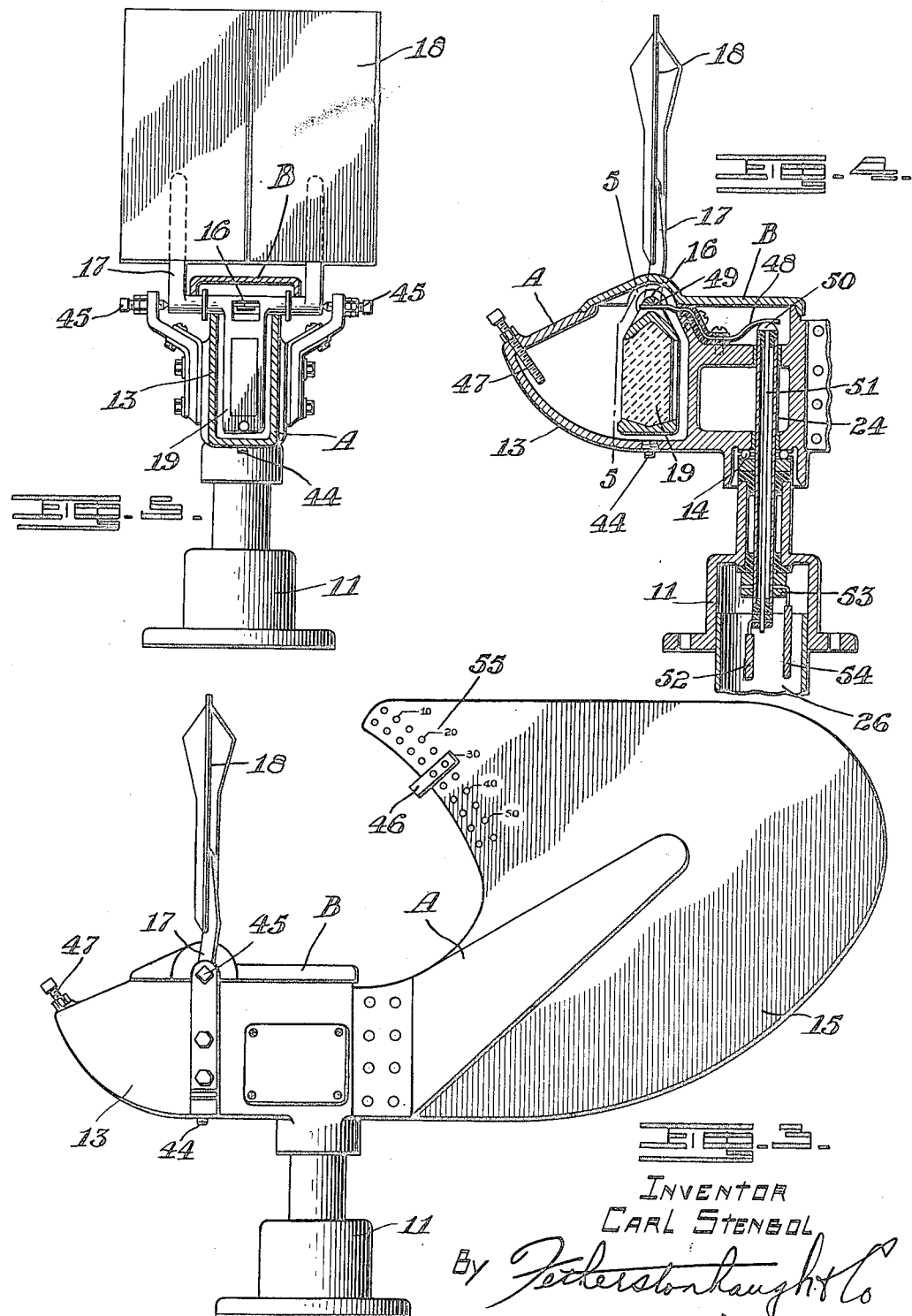

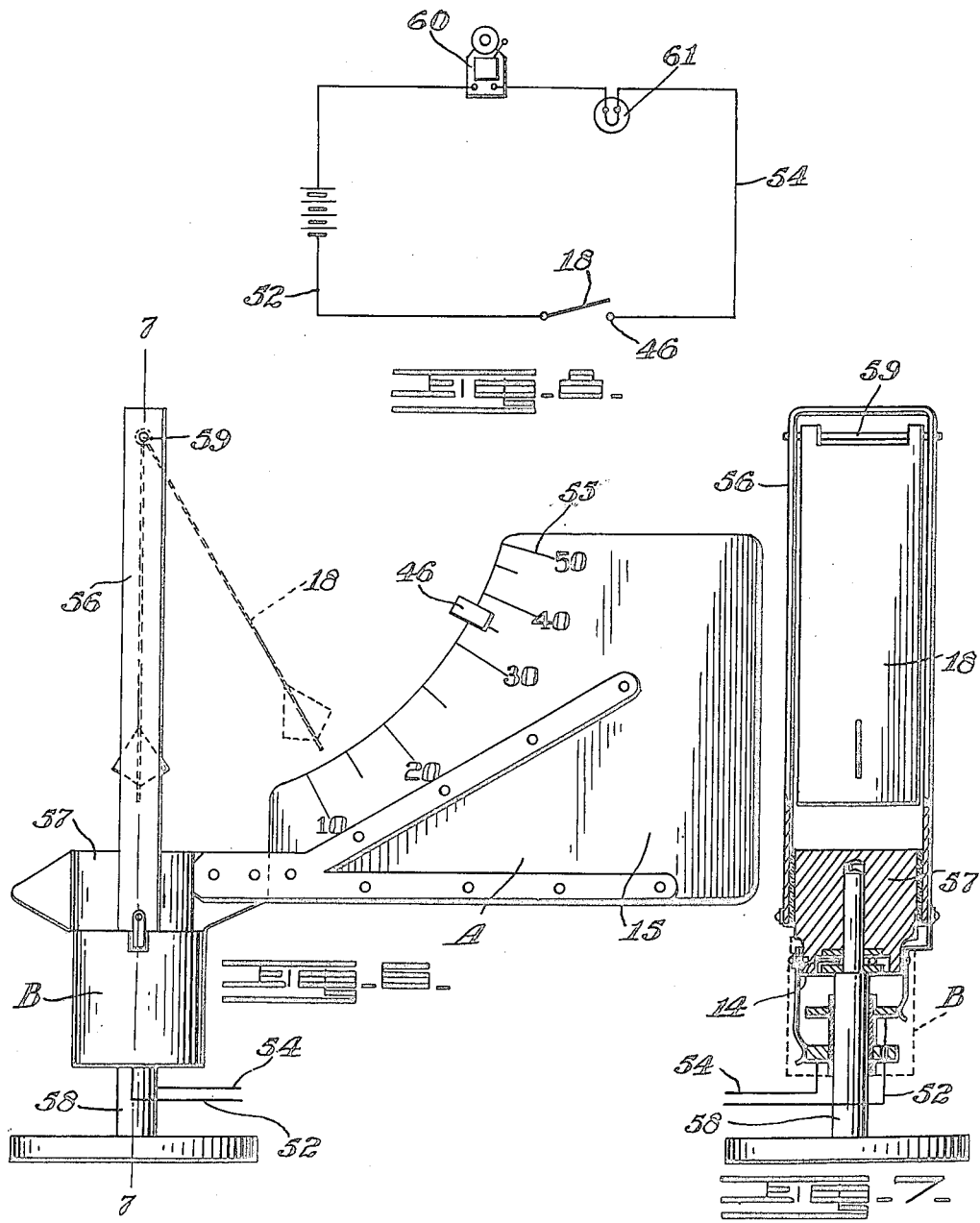

April 9, 1929.  C. STENBOL  1,708,036
WIND GAUGE OR ANEMOMETER
Filed July 17, 1925 4 Sheets-Sheet 4
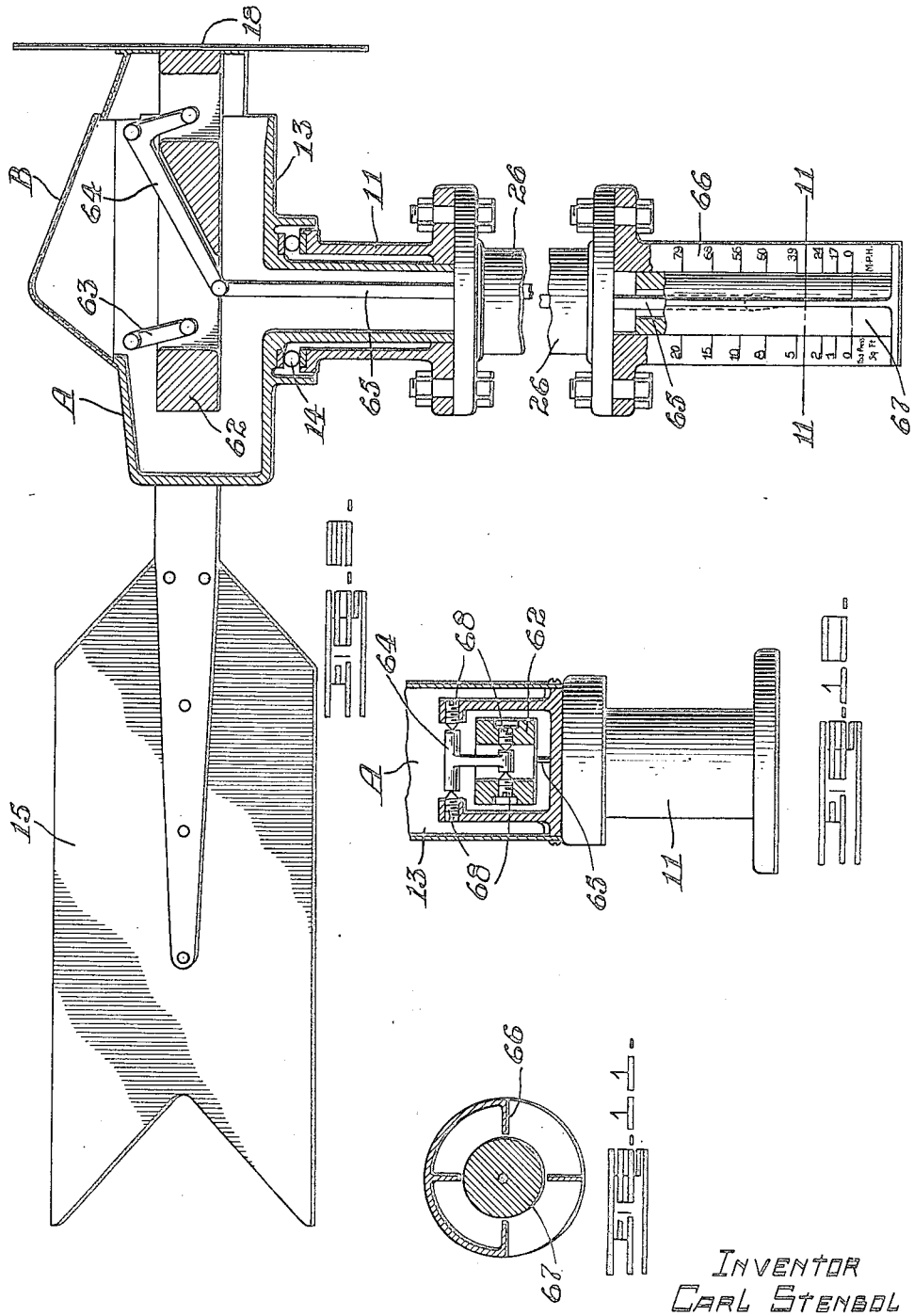
INVENTOR
CARL STENBOL
BY Fetherstonhaugh & Co.
Att'ys Patented Apr. 9, 1929.

1,708,036

UNITED STATES PATENT OFFICE.

CARL STENBOL, OF SAULT STE. MARIE, ONTARIO, CANADA.

WIND GAUGE OR ANEMOMETER.

Application filed July 17, 1925. Serial No. 44,291.

This invention relates to improvements in wind gauges or anemometers and the objects of the invention are to provide a simply constructed apparatus of this description to measure the wind pressure acting on a given surface such as pounds per square inch, which can by any well known formula be converted into the common term—so much wind in miles per hour. My invention will find ready application in the maximum wind allowable for operating movable structures such as ore and coal bridges and similar machines which have to be fastened down when wind velocity exceeds a given figure, usually between 30 and 40 miles per hour.

My improved anemometer or gauge can conveniently be attached to any such machine and the operator will be warned when the wind approaches the danger point enabling him to take proper precautions to safeguard the structure.

With the foregoing and other objects in view, the invention consists essentially in the novel construction, combination and arrangement of parts as described in the present specification and illustrated by the accompanying drawings that form part of the same.

Referring now to the drawings in which like characters of reference indicate corresponding parts in each figure, Figure 1 is a side elevation, partly in section, of my improved gauge or anemometer.

Figure 2 is a sectional end view showing the pulley and mounting,

Figure 3 is a side elevation of a modified form of gauge or anemometer,

Figure 4 is a longitudinal section of Figure 3,

Figure 5 is a section on the line 5—5 of Figure 4,

Figure 6 is a side view of a further modified form of gauge or anemometer,

Figure 7 is a section taken on the line 7—7 of Figure 6,

Figure 8 is a diagrammatic view of the wiring for the alarm,

Figure 9 is a side elevation, partly in section, of yet another modified form of my gauge or anemometer, Figure 10 is an end view, partly in section, showing the mounting of the balance member, and Figure 11 is a section on the line 11—11 of Figure 9.

Referring now more particularly to the drawings and to the example of my improved gauge or anemometer as disclosed in Figures 1 and 2, A designates the anemometer as a whole, preferably constructed of metal and provided with an enlarged base 10. The body can be made in any suitable form, the head 11 being connected therewith and adapted to rotatably carry at 12 a casing 13 mounted thereon on ball bearings 14. This casing has secured thereto, in any suitable manner, a vane or tail 15 whereby it is rotated and the pressure plate held in the direction of the wind. The detachable cover B of suitable construction is adapted to be secured to the casing 13 in any well known manner and, while protecting the operating mechanism within the casing, can be quickly removed should adjustment be required.

Pivotally mounted at 16 in suitable bearings, carried by the casing 13, is a lever 17 adapted to support the wind pressure plate 18 and formed with a counter-weight or lever portion 19 to the end of which is conected, at 20, a metal band or wire 21 designed to travel beneath a pulley 22 and over a pulley 23, then downwardly through a hollow trunnion pin 24 in the casing and extending into a socket 25 in the head 11 and designed to rotate therein with the casing on the casing being rotated through the action of the wind, in changing its direction, on the vane or tail 15. The metal band or wire 21 extends through the hollow mast 26 into the enlarged portion or base 10 and is there connected in any suitable manner to a weight 27, which is in turn secured to the hollow tube 28. This tube is partly immersed in liquid 29 in a suitable receptacle 30 to which is connected, by pipes 31, a standard vacuum recording gauge 32 placed at such a height that when the wind gauge is at rest the liquid in the receptacle 30 exerts no vacuum or pressure on the gauge. On the wind exerting pressure against the plate 18 the counter-weight 19 exerts a pull on the wire 21 and the liquid contained in the hollow tube 28 rises, thus a vacuum is created in the recording gauge 32 and marked in the usual way in a revolving clock chart 33.

As the wind gauge must be elevated and well exposed to the wind, the recording gauge has to be low down in an accessible place, the hollow mast 26, of required height, is inserted between the flanges 34 and 35. The weight of the wire 21 is predetermined and an equal amount of weight 27 is placed on the hollow tube 28. 38 designates a shield designed to prevent rust and dirt falling from within the hollow mast to the mechanism therebeneath.

In Figure 2 is shown in detail the method of mounting the flanged pulleys 22 and 23 within the casing of the anemometer. The object of this mounting is to keep the friction of operation at a minimum, the points of the screw trunnion pins 39 being adapted to engage the stub shaft 40 of the pulleys 22 and 23 and to be held in adjusted position by the jam nut 41. The sleeve 42 of the casing in combination with the nut 43 forms a housing which protects the adjustment from being tampered with.

It is obvious from the foregoing that this form of mechanism could be used with any type of pressure gauge and that the tube 28, immersed in the liquid, could be lowered to create a pressure instead of a vacuum, thus obtaining the same result.

Referring now to the modified form of the gauge or anemometer, as illustrated in Figures 3, 4 and 5, this, in contrast to the example of my anemometer as illustrated in Figures 1 and 2, consists essentially of a counter-weighted pressure plate swinging about a spring-actuated point in combination with contacts, a contact on the tail adapted to be engaged by the pressure plate simultaneously with the engagement by the counter-weight of a contact in the body or casing in which the pressure plate is mounted to close an electric circuit and consists as a whole, as illustrated in Figure 3, of a head 11 having rotatably mounted thereon the casing 13. This casing is designed to hold a liquid such as oil and is provided at 44 with a plug for releasing the liquid.

Rigidly secured to the body portion of the casing is the vane or tail 15, while suitably mounted on the lever 17 is the wind pressure plate 18. This lever 17 is swingingly mounted at 44 in the casing and is also provided with adjustable trunnion screws 45. A counter-weight 19 is connected to the lever 17 whereby, on the pressure plate being influenced by the wind, the counter-weight is swung about the pivotal point. To prevent supersensitiveness in operation the counter-weight is immersed in oil and, when swung therein, acts as a paddle would.

In combination with the plate 18 and counterweight 19, I provide on the tail a contact 46 and, extending into the casing, a contact screw 47 so that in operation the pressure plate 18 and the counter-weight 19, swinging on its pivotal point, will simultaneously engage with the contacts 46 and 47 to close a circuit.

As illustrated in Figure 4 the wiring for the circuit comprises a spring 48 suitably insulated and adapted to contact at 49 with the lever 17. This spring is suitably secured in the body of the casing and bent to engage with an insulated button or cap 50 having a shaft 51 extending through the casing body, the trunnion 24 and the head 11, the button itself being insulated from the trunnion tube and extending therethrough to connect with the terminal wire 52, the casing 13 being charged through terminal 53 and electrically connected to the wire 54 so that, as previously described, when the plate 18 engages with the contact 46 and the counter-weight 19 engages with the screw 47 as set the circuit is closed and an alarm or light may be operated therefrom announcing that the wind has reached a predetermined velocity. Calibration by means of the scale 55 and the adjustable contacts 46 and 47 can be then estimated in the ordinary way.

This example of my invention is especially adapted to overcome inaccuracy in operation due to coal dust floating in the air, under certain atmospherical conditions, forming a slight coating on the contact points sufficient to stop the alarm.

In the example of my invention, as illustrated in Figures 6, 7 and 8, the pressure plate is of the pendulum type and is particularly sensitive. The construction is very similar to that disclosed in Figures 3, 4 and 5 except that the counter-weight 19 for the pressure plate or flop 18 is dispensed with and the latter is swingingly suspended from the top of a yoke 56. This yoke in turn is mounted on a rotating hub or head 57 and is insulated therefrom the head being supported on a spindle 58. The tail 15 is carried by the head 57. The spindle is also insulated from the yoke 56 while the pressure plate 18 is swingingly mounted on a shaft 59 in the yoke 56. As in Figure 3 a stop or contact 46 is fixed on the tail 15 which in turn is also marked with a scale 55. This contact is adapted to engage with plate 18 when the wind reaches the danger point. The engagement will also complete an electrical circuit, such as is illustrated diagrammatically in Figure 8, there being arranged within the circuit a bell 60 and a signal light 61. The whole gauge, as in the examples already described, is pivotally mounted and is provided with ball bearings 14 as in the other examples shown.

From the foregoing it will be seen that three different forms of my invention have been described and illustrated, i. e.:

(1) The combination, with a rotatable top formed with a casing provided with a vane, of a pressure plate on a counter-weighted lever arm, pulley and cable connected to vacuum operating and indicating means whereby, on the pressure plate being influenced by the wind, the counter weight operates the vacuum producing means and the recording means connected therewith.

(2) The combination, with a rotatable head with a vane rigidly secured thereon and a liquid carrying casing integral with the head, of a pressure plate mounted on a pivotally mounted arm having integral therewith a counter-weight immersed in the liquid in said casing whereby, on the wind exerting pressure on the pressure plate, the latter engages with a contact arranged on the tail and with regulating screw means extending into the casing simultaneously to complete a circuit and give an alarm and light the signal.

(3) A construction for giving an alarm, similar to the example described above, but in which the counter-weight is dispensed with and the pressure plate is swingingly mounted in a yoke above the head to engage in operation with the contact point on the tail to close an electric circuit.

The wind gauge or anemometer, as shown in Figures 9, 10 and 11, is slightly different from the foregoing and discloses, with the vane 15 on the rotatable top or head, a pressure plate 18 with a horizontal, parallel motion adapted to give the same pressure for all velocities of wind, the load being transferred through weight 62, pivotally mounted on the lever 63 and bell crank lever 64, the lever 64 being connected to a rod 65 passing down through the hollow mast 26 to an indicator box 66. To the lower end of the rod 65 is fixed an indicator 67. As the wind presses against the plate 18 it actuates the weight 62 and lever 64 lifting the rod 65 with the indicator 67. As illustrating particularly in Figure 10, the levers 63 and 64 are mounted on the adjustable trunnion screws 68.

As many changes could be made in the above construction and many apparently widely different embodiments of my invention, within the scope of the claims, constructed without departing from the spirit or scope thereof, it is intended that all matter contained in the accompanying specification and drawings shall be interpreted in an illustrative and not in a limiting sense.

What I claim as my invention is:

A wind pressure gauge of the character described, and in combination a rotatable head, a radially extending vane rigidly mounted on the head, a yoke rigidly mounted on the head, a wind pressure plate swingingly mounted in the yoke, an electric circuit energizing the vane and the plate and normally held open, a combined contact member and stop on the vane adapted on a predetermined velocity of wind being reached to be engaged by the plate to close the circuit, an alarm signal in the circuit automatically operable on the circuit being closed.

In witness whereof I have hereunto set my hand.

CARL STENBOL.